(12) United States Patent
Stigsson et al.

(10) Patent No.: US 8,252,141 B2
(45) Date of Patent: Aug. 28, 2012

(54) METHOD FOR RECOVERING A LOW SODIUM CONTENT LIGNIN FUEL FROM BLACK LIQUOR

(75) Inventors: Lars Stigsson, Bjärred (SE); Curt Lindstrom, Piteå (SE)

(73) Assignee: Andritz Oy, Helsinki (FI)

( * ) Notice: Subject to any disclaimer, the term of this patent is extended or adjusted under 35 U.S.C. 154(b) by 265 days.

(21) Appl. No.: 12/520,586

(22) PCT Filed: Dec. 17, 2007

(86) PCT No.: PCT/SE2007/001113
§ 371 (c)(1),
(2), (4) Date: Oct. 21, 2009

(87) PCT Pub. No.: WO2008/079072
PCT Pub. Date: Jul. 3, 2008

(65) Prior Publication Data
US 2010/0041879 A1  Feb. 18, 2010

Related U.S. Application Data

(60) Provisional application No. 60/876,473, filed on Dec. 22, 2006.

(51) Int. Cl.
*D21C 11/10* (2006.01)
(52) U.S. Cl. .......................................................... 162/29
(58) Field of Classification Search .................. None
See application file for complete search history.

(56) References Cited

U.S. PATENT DOCUMENTS

| | | | |
|---|---|---|---|
| 3,546,200 A | 12/1970 | Whalen | |
| 5,288,857 A * | 2/1994 | Aarsrud et al. | 530/500 |
| 5,635,024 A | 6/1997 | Shall | |
| 6,632,327 B1 * | 10/2003 | Shall | 162/29 |
| 2002/0059994 A1 | 5/2002 | Kurple | |
| 2003/0156970 A1 | 8/2003 | Oberkofler | |

FOREIGN PATENT DOCUMENTS

| | | | |
|---|---|---|---|
| SE | 453 408 B | * | 2/1988 |
| WO | WO 90/06964 A1 | * | 6/1990 |
| WO | WO 2006/031175 A1 | * | 3/2006 |

OTHER PUBLICATIONS (R) Anon., "LignoBoost Technology," Innventia AB, Stockholm, SE, 5 pages Internet address downloaded on Aug. 22, 2011: <www.innventia,com/templates/STFIPage8734.aspx>.*
Supplementary European Search Report received in EP 07 85 2115 mailed Mar. 2, 2010.
Communication and European Search Opinion received in EP 07 85 2115 mailed Jun. 22, 2010.

* cited by examiner

*Primary Examiner* — Lawrence E Crane
(74) *Attorney, Agent, or Firm* — Smith, Gambrell & Russell, LLP

(57) ABSTRACT

Disclosed herein is a method for recovering a low sodium content lignin from spent kraft cooking liquor without the use a of strong mineral acid for acidulation.

17 Claims, 3 Drawing Sheets

METHOD FOR RECOVERING A LOW SODIUM CONTENT LIGNIN FUEL FROM BLACK LIQUOR

Figure 1:
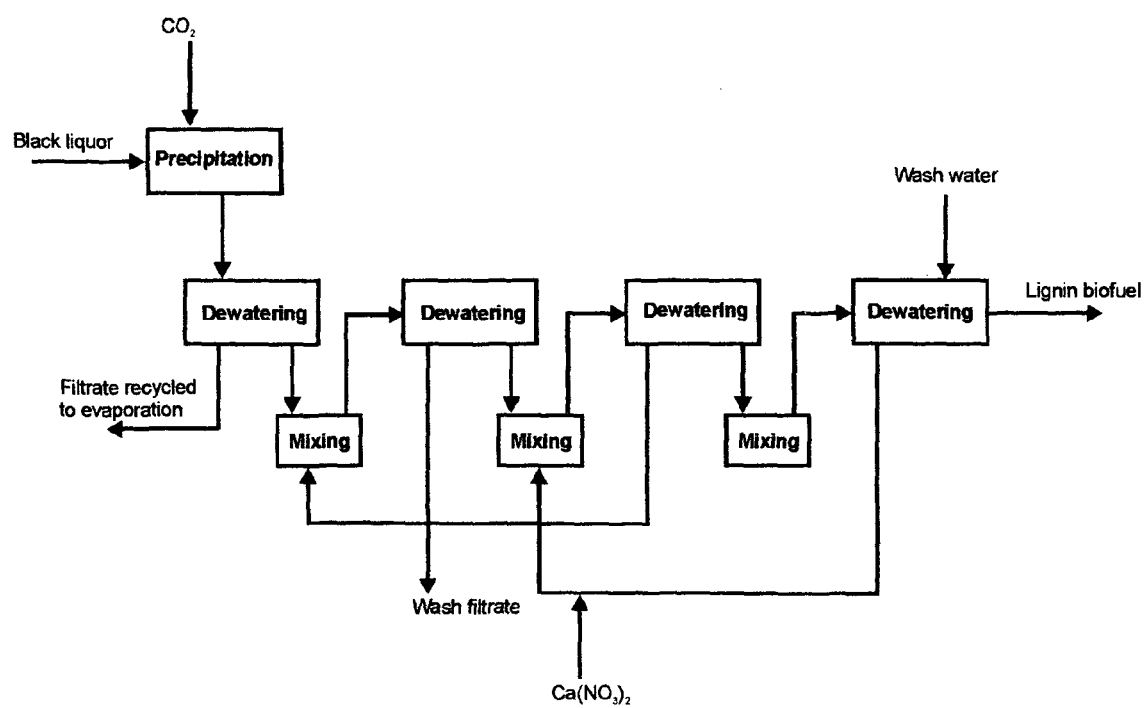

This application is a National Phase entry of PCT/SE2007/00113, filed 17 Dec. 2007, and claims the benefit of U.S. Provisional Application No. 60/876,473, expired, filed on 22 Dec. 2006, which is incorporated herein.

TECHNICAL FIELD

The present invention relates to a method for recovering low sodium content lignin from kraft spent pulping liquor without the use of mineral acids for acidulation. The present invention further relates to the use of carbon dioxide for acidulation of spent pulping liquor. Moreover the present invention relates to the washing of recovered lignin with calcium or magnesium compounds in order to remove sodium compounds bound to the lignin thereby obtaining a lignin product with low sodium content.

BACKGROUND

The recovery boiler often constitutes a bottleneck for increased pulp production in kraft mills. The lime kiln in kraft mill chemical recovery plants is normally fired with fossil fuels such as fuel oil or natural gas. Firing lignin recovered from the black liquor in lime kilns have the double benefit of offloading the recovery boiler and replacing the lime kiln fuel with internal carbon dioxide neutral biofuel. Various methods for lignin precipitation and separation from black liquor have been proposed to offload recovery boilers. These methods have been met with limited commercial success partly because the recovered lignin often is contaminated with sodium and sulphur compounds and the market for unpure lignin is limited. The use of dried lignin powder as a fuel, for example in lime kilns has been proposed. Transport, storage and handling of lignin powder are hazardous and the material is easily ignited in oxygen or air. A lignin fuel which is in liquid or solid briquette form would be desirable and such lignin fuel is disclosed in Watkinson U.S. Pat. No. 5,478,366. The liquid lignin fuel of Watkinson however comprises 35 to 60% water and a significant amount of fuel oil. A high water content of a fuel will significantly lower its effective heating value and the portion of fuel oil in a lignin fuel decreases its value as carbon dioxide neutral biofuel.

A large portion of lignin is present in the spent cooking liquor produced during chemical pulping of lignocellulosic material. Chemical pulping typically involves reduction of wood to a fibrous mass through a series of cooking and bleaching operations using strong chemicals. The two principal chemical pulping methods are the alkaline kraft process and the acidic sulfite process, each producing a different type of extractable lignin. In the more common kraft process, wood chips are cooked in a solution of sodium hydroxide (NaOH) and sodium sulfide ($Na_2S$). The alkaline attack causes fragmentation of lignin molecules, whose sodium salts are soluble at high pH. The spent cooking liquor, which is referred to as "black liquor", is separated from the cellulosic fibres and typically sent to a chemical recovery plant wherein the organic components of the black liquor, including lignin, are combusted. Typical kraft black liquor contains around 40% alkali lignin, hemicelluloses including oligo- and monosaccharides from glucomannan and xylane and inorganic sodium and sulphur compounds.

Separation of lignin from the black liquor is generally not undertaken by the pulping industry due to the limited market for lignin material. However, lignin recovery techniques have been developed, and typically involve acidification of the black liquor with sulphuric acid (U.S. Pat. Nos. 4,111,928; 4,265,809; and 5,034,094).

Reduction in the pH of black liquor containing soluble lignin salts may be accomplished by introduction of acids which converts the phenolic hydroxyl groups on the lignin molecule, which are in ionized form, into their free phenolic or acidic form. This conversion renders the lignin insoluble in the black liquor and, as a result, it precipitates out. To precipitate the alkali lignin from the black liquor as water-insoluble products, the pH of black liquor initially having a pH around 13, is lowered to a pH of about 10.5 at which point the lignin begins to precipitate. Lignin precipitation can be further accentuated by reducing the pH level to about pH 2-3 with a strong mineral acid. The precipitated lignin can be washed with an aqueous solution to remove inorganic salts and other impurities. After drying the lignin it can be used as a fuel or as a precursor for fine chemicals preparation.

New alkaline pulping processes using low concentration of sulphur chemicals in the cooking liquor are under development and commercialisation. Such a process is described for example in U.S. Pat. No. 6,770,168. The spent cooking liquor from this and other sulphur free or low sulphur pulping processes contains dissolved lignin with low sulphur content and this lignin has a larger market potential than sulphur contaminated kraft lignin.

DETAILED DESCRIPTION

A major objective of the present invention is to propose a new, efficient and innovative method for recovering of low sodium content lignin from kraft spent pulping liquor (black liquor). Lignin in black liquor contains between 80 and 120 kg sodium per kg lignin (as dry) preventing its use as fuel in any type of boiler or kiln except from the recovery boiler. The stepwise procedure disclosed herein in description and claims yields a lignin with low water content and a sodium content below about 10 kg of sodium per ton of lignin (as dry). Another major objective of the method of the present invention is to eliminate use of strong mineral acids for acidulation and precipitation of lignin from black liquor.

In accordance with the method of the present invention lignin dissolved in black liquor is precipitated from a portion of the total black liquor flow in a pulp mill by acidulation with carbon dioxide gas to a pH below about 10.5. Sodium originally bound to the lignin forms sodium carbonate and sodium bicarbonate salts that solubilises in the spent cooking liquor.

The precipitated material is dewatered before further processing. Preferably the dewatering is performed by using centrifugation, a filter press apparatus, a band filter, a rotary filter, such as drum filter or a sedimentation tank, or similar equipment, most preferred a filter press apparatus is used. An organic alcohol such as ethanol may also be present or added after lignin has been separated from black liquor. After first stage dewatering, the crude lignin product still have undesirably high sodium content and the lignin is therefore further treated with a washing liquid in one or more stages. At least one washing liquid comprises dissolved alkaline earth metal compounds with the objective to replace sodium bound to the lignin. The alkaline earth metal is a magnesium or calcium compound, for example be $Ca(NO_3)_2$ or $CaCl_2$ or other calcium or magnesium compounds which are at least partly soluble in alkaline or acidic solutions. The calcium or magnesium metal have higher affinity to bind to lignin than sodium and expels bound sodium into the spent washing liquid. The lignin is thereafter dewatered. The resulting low sulphur content lignin product may be further treated for example by pelletizing before use as a carbon dioxide neutral biofuel.

By the procedure described herein a lignin biofuel product is produced with a total sodium content lower than 10 kg as Na per ton of dry lignin material; preferable lower than 2 kg Na per ton dry material and most preferred lower than 1 kg Na per ton of dry material. By dewatering in one or more steps the water content of the low sodium lignin biofuel is lowered to a level below about 30% (by weight). Further drying of the lignin can be made by thermal treatment.

The low sodium content lignin recovered in accordance with the present invention may be further processed to pellets or briquettes. The lignin pellets is suitable as a fuel for bark boilers with ash handling systems or in lime kiln at kraft pulp mills The pellets can be pulverized prior to combustion.

We have surprisingly discovered that a low sodium content lignin can be recovered by acidulation of the spent pulping liquor with carbon dioxide gas only without the addition of a strong mineral acid such as sulphuric acid. Sulphuric acid should not be used for recovery of lignin as accumulation of sulphur creates high sulphur inventory an imbalances in the pulp mill liquor cycle. High pulping liquor sulphidity is a common problem in today's low emission kraft pulp mills.

The acidulation of black liquor leads to formation of poisonous hydrogen sulphide ($H_2S$) gas, which gas is dissolved in the lignin suspension during $CO_2$ acidulation normally performed at a small over pressure. Hydrogen sulphide gas will be released when depressurizing the system. This release is minimized or entirely avoided by a procedure in one embodiment of the present invention wherein dissolved $H_2S$ is forced to transform into $HS^-$ ions in solution by adding e.g. a base to the suspension or blowing air through the suspension.

Surface active agents and other soluble polymers can be used for supporting the lignin precipitation from black liquor in accordance with the present invention. Such additives could be of non-ionic, anionic, cationic and zwitterionic types. Preferred water soluble polymers include polymers comprising more than 50 repeating ethylene oxide units and a hydrophobic portion. (Pluronic F120, Igepal).

Preferred alkali metal components used for addition to black liquor in support of replacing sodium with a metal includes the alkaline earth metals such as calcium, magnesium and other metals such as aluminium. Calcium may be added in the form of calcium nitrate or other suitable calcium components used in kraft pulp mills. Depending on the used calcium source the wash filtrate can be either recycled to the evaporation or more preferred sent to the secondary treatment for processing before discharge from the mill. If calcium is added as calcium nitrate, and the wash filtrate is recycled to the evaporation then the nitrate may end up as NOx in the recovery boiler when burning the black liquor. If the wash filtrate which contains nitrate instead is sent to the secondary treatment, then the nitrate can function as nutrient for the active organisms in the biological treatment. If the calcium source is $CaCl_2$, then the wash filtrate will have a high chloride content and it is then unsuitable recycle to the evaporation and the wash filtrate must be sent to the secondary treatment, where chloride ions normally does not represent a problem.

The low sodium fuel of the present invention can advantageously be mixed with other liquid organic material obtained during wood processing in a pulp mill including methanol and turpentine or, if economics and legislation permits, the fuel may be mixed with fossil fuels such as fuel oil. The low sodium fuel may be fired alone or in combination with other fuels. If the low sodium lignin fuel is prepared using calcium components the fuel could advantageously be fired in a lime kiln, where the added calcium in the fuel acts as make-up chemical for the chemical recovery cycle within the pulp mill. During preparation of the low sodium content biofuel, hemicelluloses such as glucomannans and/or xylanes are liberated and these may be recovered and transformed into useful chemicals or biofuels in conjunction with preparation of the low sodium content biofuel of the present invention.

Without limiting the scope of the present invention the invention is further described by three examples below with appended figures;

Example 1

Part of the black liquor flow (800 t/d) at a kraft pulp mill is taken out within the evaporation plant where the black liquor has about 30% dry solids content. This flow is acidified by $CO_2$ to a pH of 9.8 at a temperature of 80° C., precipitating about 60% of the lignin in this flow. The precipitated material is dewatered to at least 50% dry solids content using a chamber filter press. This material is then washed to lower the sodium content. The washing is carried out by suspending the precipitated and dewatered material in a $Ca(NO_3)_2$ solution (approx 10% by weight) and washing it in a counter current fashion in 3 steps with a water flow of about 3.5 ton/ton solids. The lignin material (55 t DS/d) has a sodium content of less than 5 kg/ton dry solids after washing and an organic material content above 81% and contains approx 65 kg Ca/ton of dry lignin material. This amount of lignin has an energy value approximately corresponding to 28 t/d of fossil oil. The wash filtrate, containing nitrate (73 g/l) and sodium is discharged from the pulp mill through secondary (biological) treatment. No addition of sulfur chemicals (sulphuric acid) to the pulp mill liquor cycle is done by this procedure. A process scheme for this example is shown in FIG. 1.

Example 2

Figure 2:
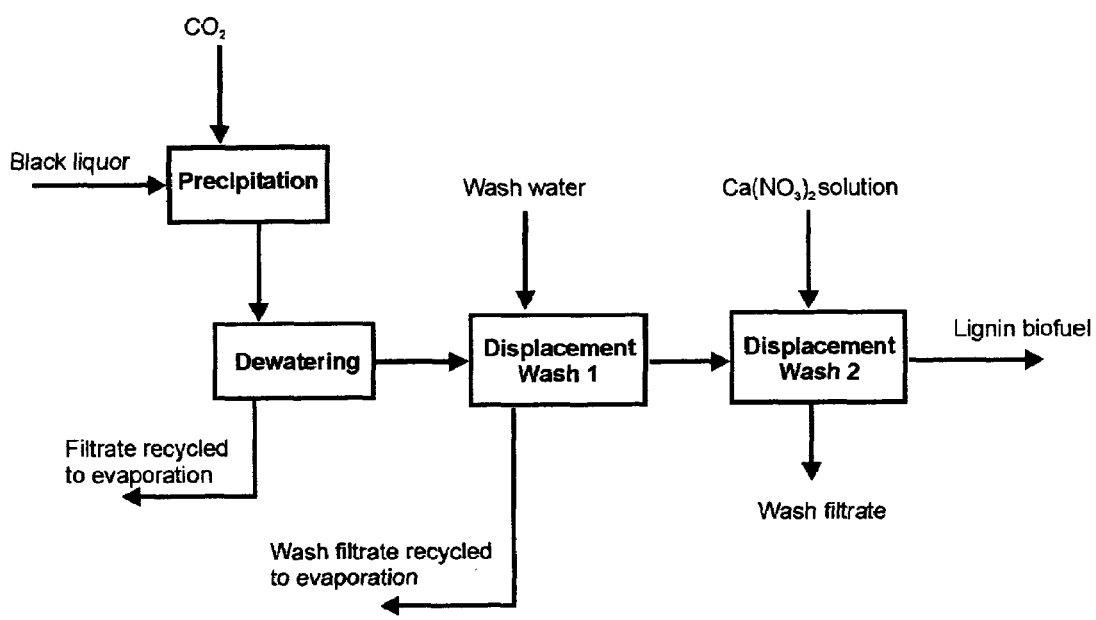

Part of the black liquor flow (800 t/d) at a kraft pulp mill is taken out within the evaporation plant where the black liquor has about 30% dry solids content. This flow is acidified by $CO_2$ to a pH of 9.2 at a temperature of 60° C., precipitating about 60% of the lignin in this flow. The precipitated material is dewatered to at least 50% dry solids content using a chamber filter press. This material is then washed in two or optionally three steps to lower the sodium content. The washing is carried out by displacement washing with condensate from the evaporators at an amount corresponding to a wash ratio of from 2.5 to 3.5. The lignin is thereafter dewatered. The dirty wash water containing sodium (25 kg/ton) and some dissolved organic material is recycled to the evaporators. In the second washing step, is the material displacement washed by a $Ca(NO_3)_2$ solution (approximately 2% Ca by weight) at a wash ratio of 3.5. The produced material (52 t DS/d) has a sodium content of less than 3 kg/ton DS and a calcium content of less than 52 kg/ton DS. The wash filtrate from washing steps, containing spent washing liquid comprising calcium ions or nitrate is separated from the mill through secondary water treatment. Optionally and in order to reach very low sodium content levels, dewatered lignin from a second or third washing stage can be re slurried in a washing liquid comprising calcium or magnesium ions and thereafter dewatered. A process scheme of this concept is shown in FIG. 2.

Example 3

Figure 3:
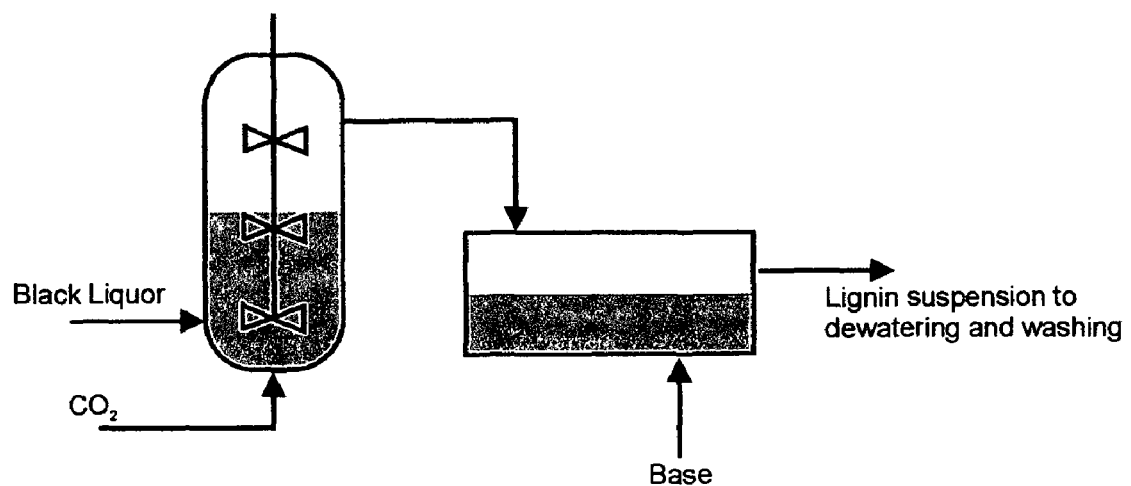

The formation of poisonous hydrogen sulphide ($H_2S$) gas is avoided in a continuous process by adding an equilibrium step where the H₂S is forced to transform into HS⁻ ions in solution by adding e.g. a base or blowing air through the system. Part of the black liquor flow (800 t/d) at a kraft pulp mill is taken out within the evaporation plant where the black liquor has about 30% dry solids content. This flow is acidified by $CO_2$ to a pH of about 8 at a temperature of 70° C., precipitating about 70% of the lignin in this flow. The suspension of precipitated lignin and black liquor is treated with a base e.g. NaOH to convert dissolved $H_2S$ to HS— ions and increasing the pH. The suspension is then dewatered and washed. A process scheme for lignin precipitation from black liquor with acidification by $CO_2$ and $H_2S$ treatment is shown in FIG. 3.

The invention claimed is:

1. A method for recovering low sodium content lignin from spent kraft cooking liquor without the addition of a strong mineral acid for acidulation of said liquor comprising the steps of:
   a) acidulating a spent kraft cooking liquor comprising solubilized lignin with carbon dioxide gas to a pH below about 10.5 thereby forming sodium carbonate and sodium bicarbonate salts that solubilizes in said spent liquor wherein said acidulation has caused the precipitation of at least a portion of lignin in spent kraft cooking liquor forming lignin agglomerates and lignin particles in said spent liquor;
   b) treating spent liquor comprising precipitated lignin from step a) by one or more of filtering, washing filtration cake with a washing liquid, and dewatering, in at least two treatment stages, wherein at least one washing liquid comprises calcium or magnesium ions, said calcium or magnesium ions replacing at least a portion of sodium bound to lignin;
   c) forming at least two separate streams of spent washing liquids from washing and dewatering performed in step b) wherein at least one spent washing liquid contains calcium or magnesium compounds originating from washing liquids used in step b); and
   d) recovering by filtration a low water and low sodium content lignin product comprising calcium or magnesium bound to said lignin.

2. The method according to claim 1, wherein the acidulation in step a) is performed in a continuously stirred tank reactor and wherein carbon dioxide is injected through nozzles in the lower section of said tank reactor.

3. The method according to claim 1, wherein spent kraft cooking liquor is treated with carbon dioxide in step a) by the addition of carbon dioxide in a quantity sufficient to reach a pH in the spent kraft cooking liquor below about 10.

4. The method according to claim 1, further comprising adding an alkaline solution to spent kraft cooking liquor after at least a portion of the lignin has precipitated in step a) in order to prevent undesired formation of hydrogen sulfide gas.

5. The method according to claim 4, wherein the addition of alkaline solution is made in order to increase pH and bind sulfur compounds in the form of hydrogen sulfide ions.

6. The method according to claim 5, wherein alkaline solution is added to increase pH in the spent kraft cooking liquor from about 9 to a pH of about 9.5.

7. The method according to claim 1, wherein a washing liquid comprises calcium compounds originating from calcium nitrate, calcium oxide, calcium hydroxide, calcium carbonate, calcium chloride or calcium acetate.

8. The method according to claim 1, wherein washing in step b) is performed in two steps by displacement washing by the addition of an amount of washing liquid corresponding to a wash ratio of from 2.5 to 3.5.

9. The method according to claim 8, further comprising at least one washing liquid added in step b) comprises condensate from kraft mill spent liquor evaporators.

10. The method according to claim 1, further comprising recycling at least one stream of the spent washing liquids to kraft mill evaporators.

11. The method according to claim 1, further comprising discharging at least one stream of the spent washing liquids to a secondary treatment and not recycling it to kraft mill evaporators.

12. The method according to claim 1, wherein the content of sodium in the lignin product of step d) is lower than 10 kg as sodium per ton of dry lignin.

13. The method according to claim 1, wherein the water content of the lignin product in step d) is lower than about 30%.

14. The method according to claim 1, further comprising pelletizing the lignin product and applying as a fuel in limekilns or power boilers the pelletized lignin product.

15. The method according to claim 3, wherein the pH is about 9.

16. The method according to claim 1, wherein the content of sodium in the lignin product of step d) is lower than 2 kg sodium per ton dry lignin product.

17. The method according to claim 1, wherein the content of sodium in the lignin product of step d) is lower than 1 kg sodium per ton of dry lignin product.

* * * * *